United States Patent [19]
Ballard

[11] Patent Number: 5,987,457
[45] Date of Patent: Nov. 16, 1999

[54] QUERY REFINEMENT METHOD FOR SEARCHING DOCUMENTS

[75] Inventor: Clinton L. Ballard, Suquamish, Wash.

[73] Assignee: Acceleration Software International Corporation, Poulsbo, Wash.

[21] Appl. No.: 08/969,961

[22] Filed: Nov. 25, 1997

[51] Int. Cl.[6] .................................................. G06F 17/30
[52] U.S. Cl. .......................... 707/5; 707/2; 707/3; 707/10
[58] Field of Search .................................. 707/5, 3, 2, 1, 707/10

[56] References Cited

U.S. PATENT DOCUMENTS

| | | | |
|---|---|---|---|
| 4,554,631 | 11/1985 | Reddington | 707/4 |
| 5,263,159 | 11/1993 | Mitsui | 707/5 |
| 5,488,725 | 1/1996 | Turtle et al. | 707/5 |
| 5,535,382 | 7/1996 | Ogawa | 707/5 |
| 5,598,557 | 1/1997 | Donner et al. | 707/5 |
| 5,642,502 | 6/1997 | Driscoll | 707/5 |
| 5,671,404 | 9/1997 | Lizee et al. | 707/5 |
| 5,675,710 | 10/1997 | Lewis | 706/12 |
| 5,765,150 | 6/1998 | Burrows | 707/5 |
| 5,787,421 | 7/1998 | Nomiyama | 707/5 |
| 5,848,407 | 12/1998 | Ishikawa et al. | 707/2 |
| 5,848,410 | 12/1998 | Walls et al. | 707/4 |
| 5,855,015 | 12/1998 | Shoham | 707/5 |
| 5,913,215 | 6/1999 | Rubinstein et al. | 707/10 |

OTHER PUBLICATIONS

Boyd, Christine; "Interactive Query Refinement Tool for the Husky Search Web Search Service," Univ. of Washington, found on the Internet on Oct. 18, 1997.

"Relevance Feedback for IR," found on the Internet on Oct. 18, 1997.

Kahle et al., "An Information system for Corporate Users: Wide Area Information Servers," found on Internet Oct. 18, 1997

"Information Retrieval Using a Human Memory Extension Model," found on Internet Oct. 18, 1997.

Hermans, Bjorn; "Intelligent Software Agents on the Internet: . . . " found on Internet Oct. 18, 1997.

*Primary Examiner*—Paul V. Kulik
*Assistant Examiner*—Greta L. Robinson
*Attorney, Agent, or Firm*—Steven P. Koda, Esq.

[57] ABSTRACT

A user views search results and subjectively determines if a document is desirable or undesirable. Only documents categorized by the user are analyzed for deriving a list of prospective keywords. The frequency of occurrence of each word of each document is derived. Keywords that occur only in desirable documents are good keywords. Keywords that occur only in undesirable documents are bad keywords. Keywords that occurs in both types are dirty keywords. The best keywords are the good keywords with the highest frequency of occurrence. The worst keywords are the bad keywords with the highest frequency of occurrence. A new query phrase includes the highest ranked good keywords and performs filtering using the highest ranked bad keywords. Key phrases are derived to clean dirty keywords into good key phrases. A key phrase also is derived from a good keyword and replaces the good keyword to narrow a search.

43 Claims, 4 Drawing Sheets

QUERY REFINEMENT METHOD FOR SEARCHING DOCUMENTS

BACKGROUND OF THE INVENTION

This invention relates to methods for searching documents, and more particularly to a method for refining a query to generate an effective search phrase.

Electronic searching by generating a query phrase is commonly used for searching databases. With the expanded use of the INTERNET and the world wide web ('the web'), query based searching has expanded to encompass file systems, databases and other data collections accessible over the internet. The unit retrieved as a hit from a query is referred to herein as a document. On the web, a document often is referred to as a page or web page. The term document as used herein, includes files (as per the Windows operating system usage), documents (as per the MacOS operating system usage), pages (as per the web phraseology usage, and other records, entries or terminology used to describe a unit of a data base, a unit of a file system or a unit of another data collection type, whether or not such units are related or relational.

There are many search engines offered through web sites which enable one to search the internet. The internet includes millions of documents encompassing a broad array of topics. When a user searches the web, for example, a typical query often returns hundreds or thousands of documents. Many search engines show the user merely a portion of the query results. As a user peruses the returned documents, the user typically will find many documents of interest (i.e., desirable), and many documents not of interest (i.e., undesirable). Many undesirable documents result because the querying method is an objective tool which evaluates relevancy based only upon a query phrase. The query phrase is a compromise. The user makes an attempt to specify objectively what documents are desired. Subjectively the user often determines desirability of a document using more than the keywords or other content of a query phrase. The undesirable documents often are returned because the user did not specify an effective query phrase. Accordingly, there is a need for a method which assists a user in forming an effective query phrase. More particularly, there is a need for a query refinement method which formulates an effective query phrase to return many desirable documents and none or few undesirable documents.

One method for generating improved query phrases is to analyze initial query results and suggest new keywords using a conventional algorithm referred to as a term frequency inverse document frequency (TF-IDF) algorithm. See for example, "Interactive Query Refinement Tool for the Husky Search Web Service," by Christin Boyd, University of Washington Computer Science and Engineering, Mar. 20, 1997. The main assumption of this method is that a word is relevant to a subset of documents if the word appears frequently in a few documents. According to the method, each document retrieved or an abstract or other prescribed snippet of the document is analyzed to determine if there are words that occur frequently in a few documents and infrequently in the remaining documents. Such words are weighted. Any such words or just those above a prescribed weight are offered to the user as suggested keywords. The user then reformulates a query phrase.

Another method for automatically generating improved query phrases is the well known relevancy feedback methodology. The main assumption of relevancy feedback is that documents relevant to a particular query resemble each other. Resemblance is used in the sense that the documents are represented by reasonably similar vectors of keywords or descriptors. This implies that if a retrieved document has been identified as relevant to a given query, the query formulation can be improved by increasing the query's similarity to the retrieved relevant document. The reformulated query is expected to retrieve additional relevant documents similar to the original relevant document. For example, using conventional search options (e.g., boolean operator(s) and keyword(s)) a user presents a query statement which results in retrieval of an initial set of documents. By browsing the initial documents the user then selects documents deemed relevant. Keywords then are derived from the documents considered relevant and added to the initial query phrase to form a refined query. A new search is then performed to identify new documents. Using a method referred to as probabilistic relevance feedback, additional keywords are identified by comparing the frequency of occurrence of a term in the documents considered to be relevant in comparison to the frequency of occurrence of the same term for the entire document collection. If the term occurs more frequently in the relevant documents than in the entire collection, then such term is assigned a higher weight. A prescribed number of terms found to have the highest weight (e.g., the 10 terms with the highest weight) are used as additional keywords. This invention relates to an alternative method for deriving keywords from the initial query results.

SUMMARY OF THE INVENTION

According to the invention, a method of generating a query phrase identifies effective keywords by analyzing documents retrieved from an initial query which are indicated by a user to be desirable or undesirable. Initially, a user forms a query phrase and performs a search using a known or proprietary search engine. The search engine then returns a list of documents found. The user then reviews at least some of the retrieved documents and marks at least one document as of interest (i.e., desirable) and at least one other document as not of interest (i.e., undesirable).

According to an aspect of this invention, only those documents indicated by the user as being either of interest or not of interest are analyzed. These documents are referred to herein as categorized documents. The remaining, uncategorized documents are ignored for purposes of refining a query phrase.

According to another aspect of the invention, each categorized document is analyzed to generate a list of keywords based on the number of times such word occurs in the document. A keyword container database then is formed which identifies each document a keyword occurs in, and the number of occurrences in such document.

According to another aspect of the invention, each keyword in the keyword container database is analyzed to identify which keywords occur only in the documents categorized as being of interest (i.e., good keywords), which keywords occur only in the documents categorized as not being of interest (i.e., bad keywords), and which keywords occurs in documents that are both of interest and not of interest (i.e., dirty keywords). The keywords occurring only in documents of interest are grouped and sorted by number of documents and/or cumulative number of occurrences. The keywords occurring only in documents not of interest also are grouped and sorted by number of documents and/or cumulative number of occurrences. The keywords occurring in both documents of interest and not of interest also are grouped. A ratio is derived for each dirty keyword of the number of documents of interest that the word occurs in to the number of documents not of interest that the word occurs in. The dirty keywords are sorted by the ratio value.

According to another aspect of the invention, the best keywords are the keywords occurring in the highest number of documents categorized as of interest (or alternatively, the highest number of occurrences in documents of interest). The worst keywords are the keywords occurring in the highest number of documents categorized as not of interest (or alternatively the highest number of occurrences in documents not of interest). One or more dirty keywords having the highest ratio, as described above, also may be used as a keyword.

According to another aspect of the invention, a query phrase is generated by performing a logical 'AND' of the initial query phrase with additional keywords. This limits the search domain of the new query to the initial documents found with the initial query phrase. In effect, the new query phrase is used to search through the other documents retrieved which the user did not look through or categorize. For example, if an initial query returns 3000 documents, and the user categorizes 6, the subsequent query is used to search through and evaluate the other documents to determine whether any of these are likely to be of interest to the user.

According to another aspect of the invention, the query phrase for the subsequent query includes search operators which cause documents to be searched for the highest ranked good keywords (e.g., search using prescribed number of best keywords). In addition, filtering is performed by including search operators which omit documents found to have any of the highest ranked bad keywords (e.g., filter out using prescribed number of worst keywords).

According to another aspect of the invention, where there are not enough good keywords to fill the prescribed number of best keywords, then the dirty keywords having the highest ratio, as described above, are used to fill in spaces for additional best keywords.

According to another invention described herein, key phrases are derived for use as query phrase descriptors. Initially, a user forms a query phrase and performs a search using a known or proprietary search engine. The search engine then returns a list of documents found. The user then reviews at least some of the retrieved documents and marks one or more document as of interest (i.e., desirable), and zero or more documents as not of interest (i.e., undesirable). Keywords are derived from the documents of interest as per the methods described above. Multiple key phrases are derived from a keyword and substituted for the keyword. A key phrase is obtained by looking at each occurrence of a good keyword and combining such good keyword with the word preceding it in each occurrence. In addition, key phrases are also obtained by looking at each occurrence of the good keyword and combining such good keyword with the word following it in each occurrence. The two-word key phrases then are used in place of the one-word keyword.

According to another aspect of the invention, for each two word phrase occurring more than once, three word phrases are formed in the same manner as the two word phrases. The three word key phrase is used in place of the two word key phrase. The process of building a key phrase continues in some embodiments up to a key phrase having at most a prescribed number of words (e.g., 5), or until no more key phrases occurring more than once are found. As the key phrase grows in length, the shorter key phrase from which it grew is dropped as a keyword. In some embodiments, the key phrases are ranked by frequency of occurrence and by word length. The longest length key phrases and/or the most frequently occurring key phrases are used in the new search query. As a result, the best keywords are narrowed. In turn the scope of the search is narrowed to return those documents that are most likely to be of interest to the user.

According to another aspect of this invention, in embodiments in which one or more documents are categorized as of interest and one or more documents are categorized as not of interest, key phrases are formed to clean a dirty keyword. A key phrase is obtained by looking at each occurrence of the highest ranking dirty keywords in the documents of interest and combining each such dirty keyword with the word preceding it in each occurrence. In addition, key phrases are also obtained by looking at each occurrence of the highest ranking dirty keywords in the documents of interest and combining each such dirty keyword with the word following it in each occurrence. The two-word key phrases then are used in place of the one-word dirty keyword. Such method is performed iteratively in some embodiments to obtain three word or longer phrases to clean dirty keywords. To clean the dirty keywords means to form key phrases from the occurrences of the dirty keyword in the documents of interest. It is expected that such key phrase(s) occurring in the document(s) of interest are likely to be absent from the documents not of interest.

One advantage of this invention is that more effective search queries are obtained based on subjective feedback from a user. A user views at least some of the results of an initial query and subjectively determines if a document is of interest or not of interest. Such information is used to automatically derive keywords for a subsequent search query phrase. Another advantage is that the derivation and use of key phrases has been found to be highly effective at improving the refined query results. The user can override any of the automatically generated query phrase clauses. These and other aspects and advantages of the invention will be better understood by reference to the following detailed description taken in conjunction with the accompanying drawings.

DESCRIPTION OF SPECIFIC EMBODIMENTS

Computer Environment

Figure 1:
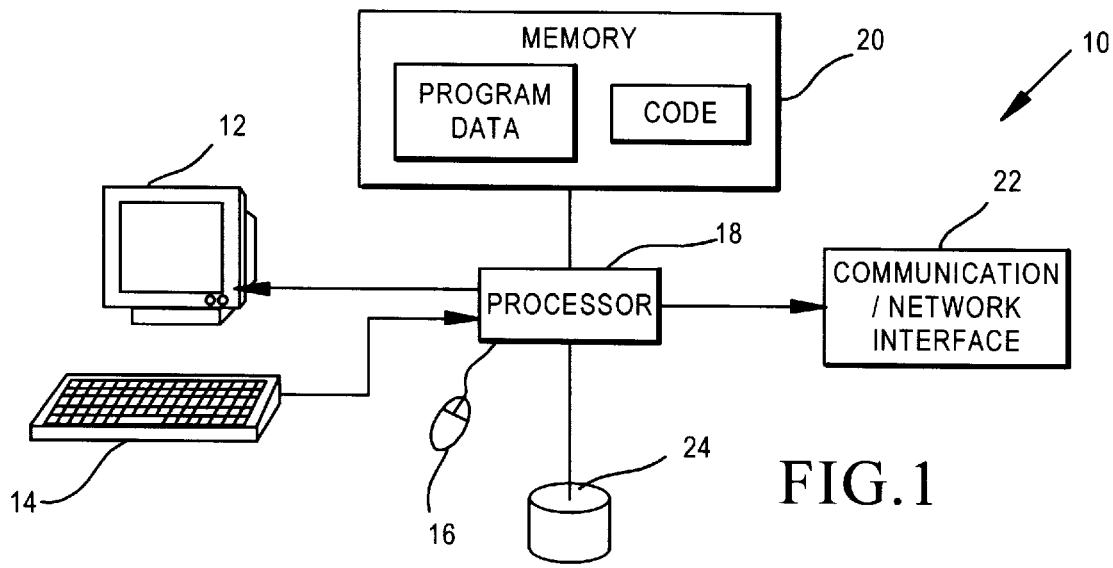
FIG. 1 is a block diagram of an exemplary computer system implementing a method embodiment of this invention.

As used herein the term computer includes any device or machine capable of accepting data, applying prescribed processes to the data, and supplying results of the processes. The functions of the present invention preferably are performed by a programmed digital computer of the type which is well known in the art, an example of which is shown in FIG. 1. FIG. 1 shows a computer system 10 having a display monitor 12, a keyboard 14, a pointing/clicking device 16, a processor 18, memory 20, a communication or network interface 22 (e.g., modem; ethernet adapter), and a non-volatile storage device 24, such as a hard disk drive, floppy disk drive and/or CD-ROM drive. The memory 20 includes storage area for the storage of computer program code and for the storage of data. The processor is coupled to the display 12, the memory 20, the keyboard 14, the point/clicking device 16, the interface 22 and the storage device 24. The interface 22 provides a channel for communication with other computers and data sources linked together in a local area network and/or a wide area network. A network of particular interest for this invention is the internet, including the world wide web. The computer system 10 may be any of the types well known in the art, such as a mainframe computer, minicomputer, workstation, or personal computer, or a network computer or network terminal.

Document Retrieval

Figure 2:
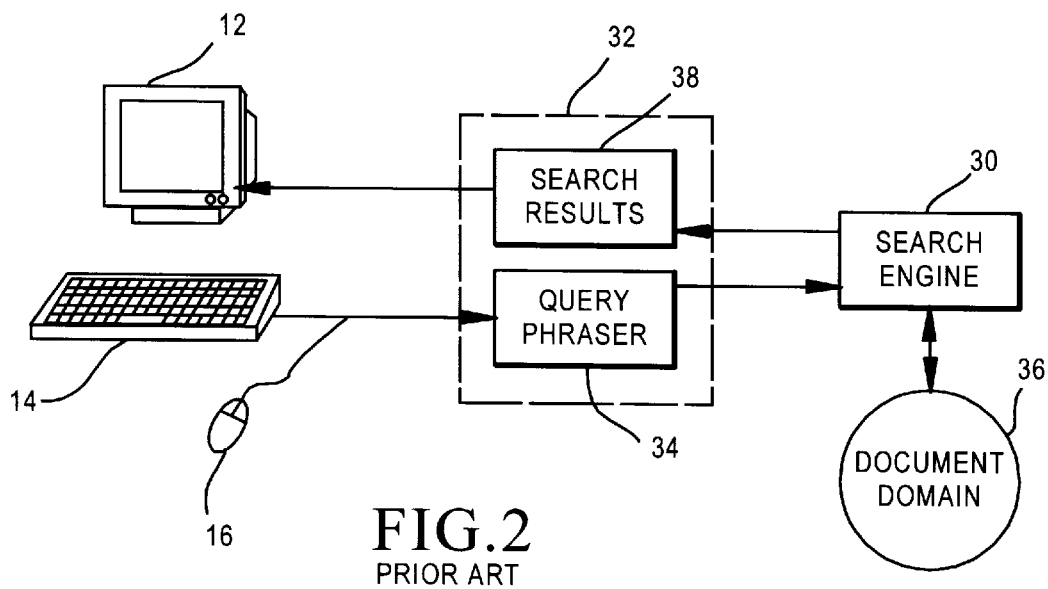
FIG. 2 is a functional block diagram of a conventional document retrieval system.

One use of the computer system 10 is to search for documents of interest to a user. A user may access a resident database stored on the computer 10, or may access a nonresident database via the interface 22. In an internet implementation many databases linked via the internet may be accessed and searched. To find documents of interest a search engine is used. Private databases have corresponding search engines. For the internet there are many search engines available for searching, (e.g., yahoo search engine, magellan search engine). FIG. 2 shows a functional diagram of a conventional document retrieval system, including a conventional search engine 30 and a user interface 32. A user interacts with the system via a keyboard 14, mouse 16 and display 12. The conventional search engine 30 allows the user to input descriptors, such as keywords and boolean operators (e.g., and; or; not). A query phraser 34 forms a query phrase from such descriptor inputs. The search engine 30 then performs a search of a document domain 36 (i.e., one or more data bases, file systems or data collections) to find documents meeting the search criteria described in the query phrase. The term document as used herein, includes files (as per the Windows operating system usage), documents (as per the MacOS operating system usage), pages (as per the web phraseology usage), and other records, entries or terminology used to describe a unit of a data base, a unit of a file system or a unit of another data collection type, whether or not such units are related or relational, or of the same data base, file system or data collection.

The conventional document retrieval system also includes an interface for presenting search results 38 to the user. For example, a one-line listing or multi-line abstract may be displayed for each document found. When searching the internet hundreds or thousands of hits may occur. Rather than show the user a listing for all the found documents, it is common to show just a portion of the findings. Some search engines specify only a subset of the total number of documents found and allow the user to request to see additional listings.

For purposes of this invention, the first search query is referred to as an initial query or an initial search query, and the phrase submitted with such query is the initial query phrase. The method of this invention may be used with a conventional search engine for an internet embodiment or with an existing search engine for another network type to formulate an improved or refined query phrase. According to a preferred embodiment the improved query phrase includes the initial query phrase and an added portion 'anded' to the initial query phrase which narrows the findings. It is assumed that the initial query phrase is specified broadly enough to encompass many documents of interest to the user. In particular it is assumed that the initial query phrase pulls in too many documents, including those that are of interest to the user and many not of interest. The objective is to filter out those documents not of interest and to identify those documents which are of the most interest to the user.

Method of Document Retrieval

Figure 3:
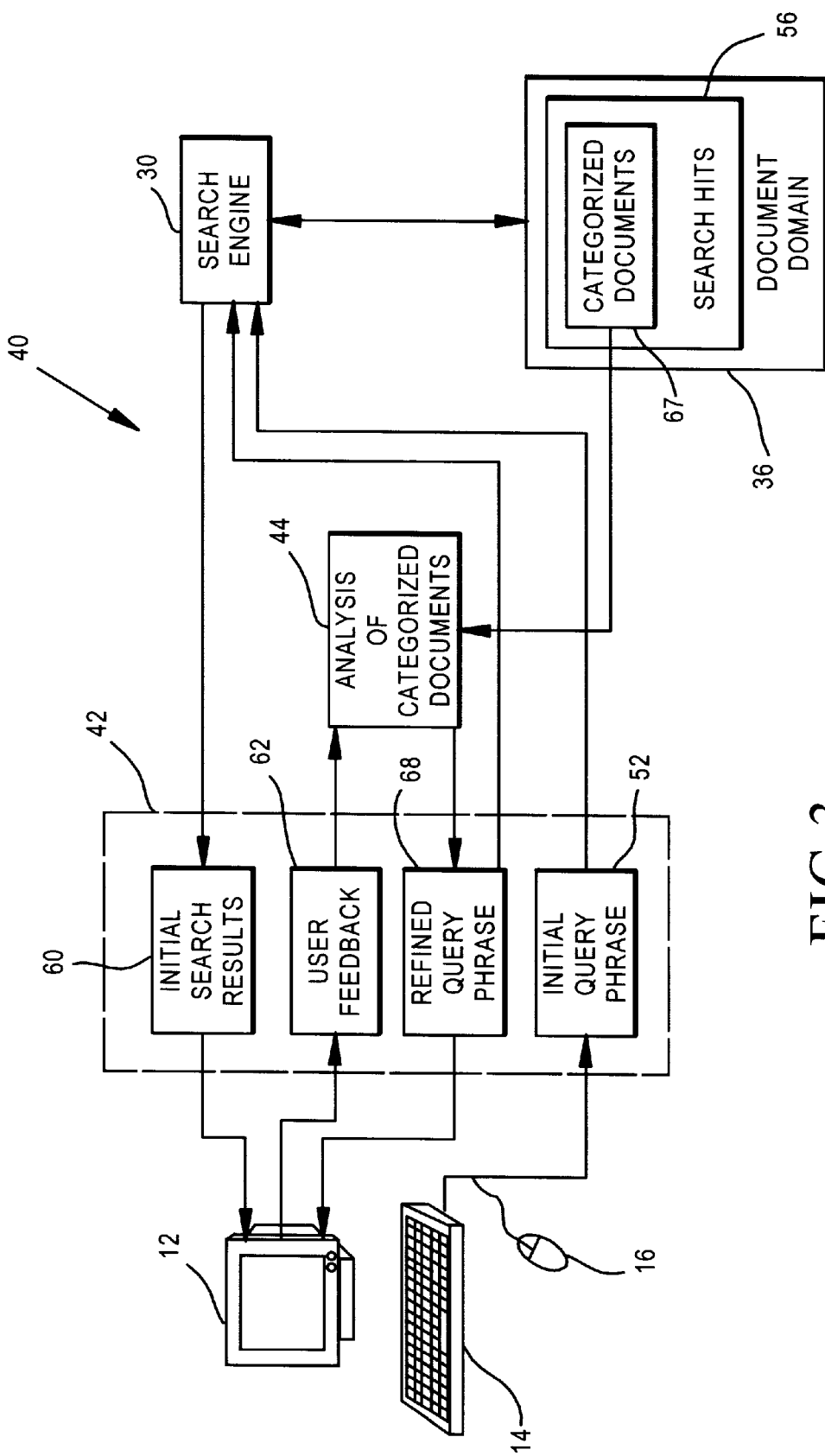
FIG. 3 is a functional block diagram of a document retrieval system according to an embodiment of this invention.

FIG. 3 shows a document retrieval system 40 according to an embodiment of this invention. The document retrieval system 40 is implemented by one or more computers, such as the computer system 10 of FIG. 1. The document retrieval system 40 includes a conventional search engine 30, a user interface 42 and an analysis module 44. A user interacts with the system 40 via a keyboard 14, mouse 16 and display 12. The conventional search engine 30 receives a query phrase formed by descriptors, such as keywords and boolean operators (e.g., and; or; not). The user interface 42 enables a user to input and edit the query phrase. The user interface 42 also allows a user to view search results.

Figure 4:
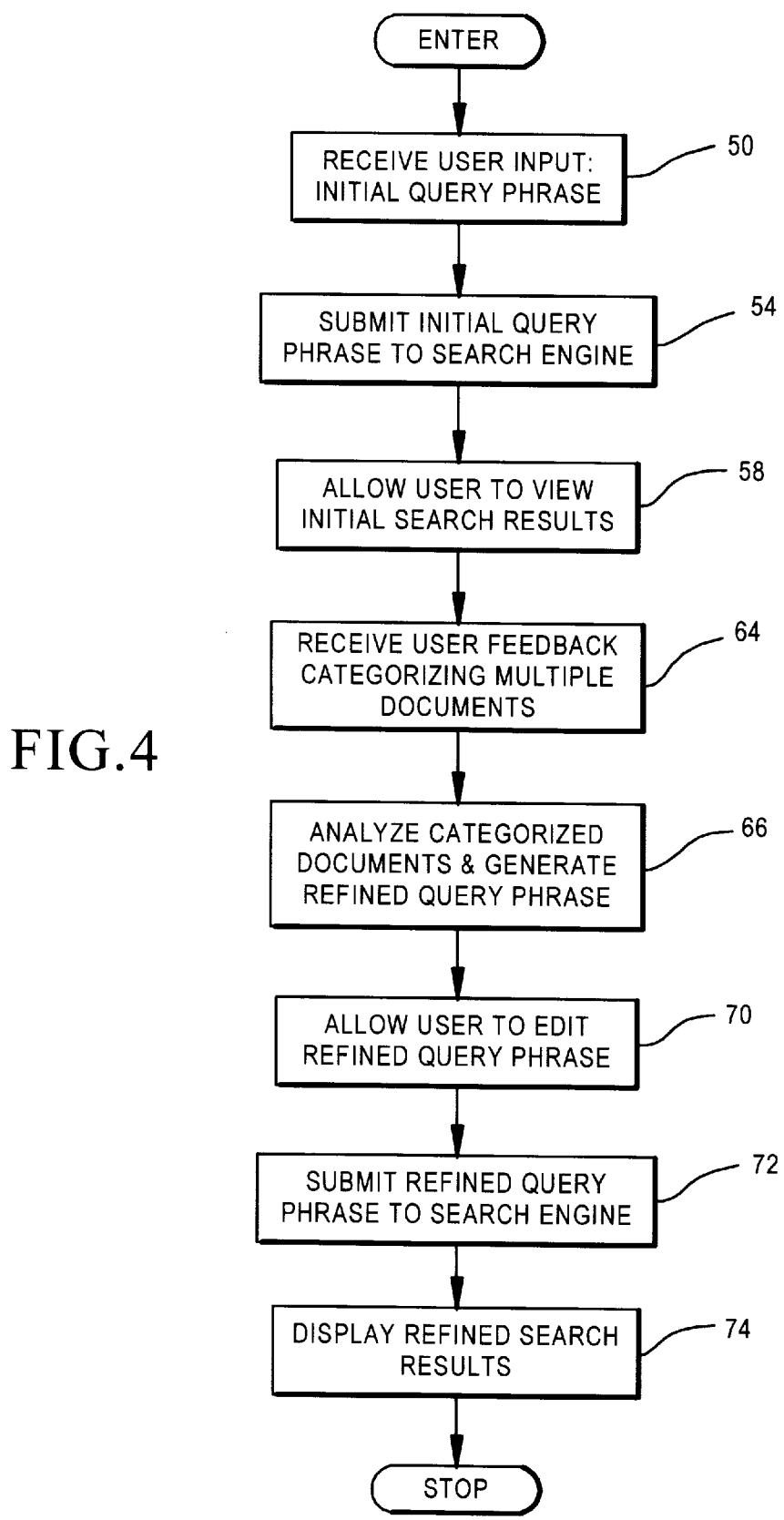
FIG. 4 is a flow chart of a method for retrieving documents according to an embodiment of this invention.

FIG. 4 shows a flow chart of a method for retrieving documents according to an embodiment of this invention. At one step 50 a user inputs an initial query phrase 52. At step 54 the initial query phrase 52 is submitted to the search engine. The search engine 30 then performs a search of the document domain 36 (e.g., internet sites, a file system, a data base, a data collection). The documents meeting the criteria of the initial query phrase are search hits 56. A listing or excerpt of the search hits then are displayed at step 58 as the initial search results 60. The user is able to access all or a portion of each document which is a search hit. In some embodiments the user is shown a partial listing of the search hits and an indication of how many hits occurred (e.g., shown are 15 of 3000 hits). Typically, the user is given a one-line listing and can click on a listing to access (or hyperlink to) a more detailed view of the document (e.g., abstract; snippet) or a full listing of the document.

The user interface 42 allows the user to provide user feedback 62 indicating whether a document is 'of interest' or 'not of interest'. Terms such as relevant and irrelevant, desirable and undesirable, or other categorizations also may be used. The user views the detailed listing (e.g., abstract or snippet) or full listing of multiple search hits. At step 64 feedback is received categorizing at least one document as 'of interest' and at least one document as 'not of interest'. The more documents which the user categorizes the more effective the query refinement process is. At step 66 the categorized documents 67 are analyzed. Such analysis does not consider the uncategorized documents even if the user viewed one or more of such documents and did not provide feedback. (In alternative embodiments documents viewed but not actively categorized as implicitly categorized as 'not of interest'.) The result of the analysis step 66 is a refined query phrase 68 which is displayed to the user. At step 70 the user is able to edit the refined query phrase 68 by adding, deleting or changing various clauses of the refined query phrase. The user then indicates that the refined query phrase 68 is ready to be submitted for searching. At step 72 the refined query phrase 68 is submitted to the search engine 30. The search engine 30 then performs another search. The results of the search are then displayed to the user at step 74. The search results at step 74 are likely to be more of interest to the user than the initial search results 60. In particular the refined query phrase 68 is more effective at identifying documents of interest and at filtering out documents not of interest than the initial query phrase.

Method for Analyzing Categorized Documents and Generating Refined Query Phrase

Figure 5:
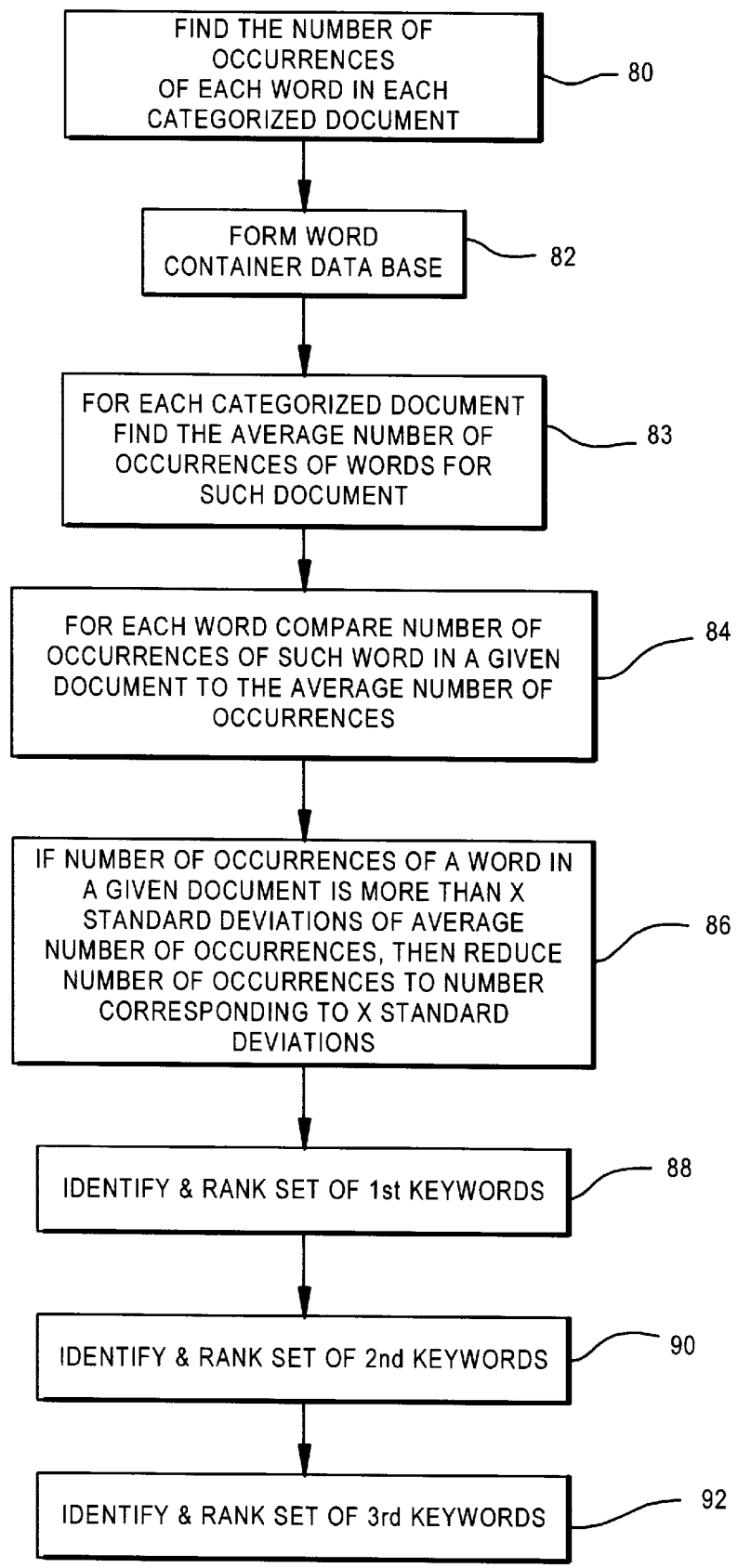
FIG. 5 is a flow chart of a method for analyzing categorized documents to refine a query phrase according to an embodiment of this invention.

The key to achieving more effective search results occurs at the step 66 where the categorized documents 67 are analyzed to generate a refined query phrase 68. FIG. 5 shows a flow chart of the analysis performed at step 66. At step 80, each categorized document 67 is analyzed to find the number of occurrences of each word in the document. At step 82, all the words of all the categorized documents 67 are grouped into a word container database which enables identification of the document which the word occurs in, along with the number of occurrences in the document.

In some embodiments steps 84 and 86 are performed. First, the average number of occurrences of words for a given document is derived. For example, if a document includes 2000 words and is made up of 200 unique words, then the average number of occurrences of words for that document is 10. At step 84, the number of occurrences of each word in a document is compared to such average number of occurrences. If the number of occurrences is more than a prescribed number of standard deviations above the average, then at step 86, the number of occurrences is reduced to a number corresponding to the prescribed number of standard deviations above the average. The purpose of these steps of comparing and reducing are to prevent a word over-used in one document from corrupting the ranking of such word overall among all documents.

In one embodiment the number of documents is a primary indicator while the number of total occurrences is a secondary indicator. At step 88, a set of first keywords (e.g., good keywords) are identified as the words which occur only in the documents 'of interest. Such words are ranked (or sorted) by the number of documents in which they occur. A tie breaker (or secondary sort) is the total number of occurrences of the word. The first keywords occurring in the most documents of interest and only in documents of interest are the best keywords. For ties, the first keyword having the higher number of occurrences in documents of interest is given the higher ranker as a better keyword. In other embodiments ties are broken by a random selection ranking one higher than the other.

At step 90 a set of second keywords (e.g., bad keywords) are identified as being those words which occur only in the documents 'not of interest.' Such words are ranked (or sorted) by the number of documents 'not of interest' in which they occur. A tie breaker (or secondary sort) is the total number of occurrences of the word in all documents 'not of interest'. The second keywords occurring in the most documents 'not of interest' and only in documents 'not of interest' are the worst keywords (i.e., highest ranked second keywords). For ties, the second keyword having the higher number of occurrences in documents 'not of interest' is given the higher ranker as a worse keyword. In other embodiments ties are broken by a random selection ranking one higher than the other.

In an alternative embodiment, the total number of occurrences of a word is the primary indicator while the number of documents (i.e., categorized documents) the word occurs in is not tallied or is a secondary indicator (i.e., tie-breaker). Thus, a set of first keywords (e.g., good keywords) are identified as the words which occur only in the documents 'of interest'. Such words are ranked (or sorted) by the number of occurrences. The first keywords with the most occurrences are the best keywords. A tie breaker (or secondary sort) is the number of documents the word occurs in. In other embodiments ties are broken by a random selection ranking one higher than the other. A set of second keywords (e.g., bad keywords) are identified as the words which occur only in the documents 'not of interest'. Such words are ranked (or sorted) by the number of occurrences. The second keywords with the most occurrences are the worst keywords. A tie breaker (or secondary sort) is the number of documents the word occurs in. In other embodiments ties are broken by a random selection ranking one higher than the other.

At step 92 a set of third keywords (e.g., dirty keywords) are identified as being those words which occur in both documents 'of interes' and documents 'not of interest.' The third keywords are ranked by a ratio of number of documents of interest that the word occurs in to the number of documents not of interest that the word occurs in. In some embodiments a tie breaker is a ratio of the number of occurrences in documents 'of interest' to number of occurrences in documents 'not of interest.' In other embodiments, ties are broken by a random selection ranking one higher than the other.

The refined query phrase 68 then is generated by any of several methods. In one method, a prescribed number of the highest ranked first keywords (i.e., the best keywords) are used as search criteria. In addition a prescribed number of the highest ranked second keywords (i.e., the worst keywords) are used as filtering criteria (i.e., search using 'not' as an operator with each of the worst keywords). Where the number of best keywords does not fill the prescribed number of highest ranked first keywords, then the highest ranked third keywords are used to fill the available slots (i.e., those keywords having the highest ratio value).

In an alternative embodiment, a dynamic ranking process is used. To find the best keywords the highest ranked first keyword is selected. Each page that such keyword occurs in then is removed from consideration. In addition the number of occurrences for each first keyword is reduced by the number of occurrences of each such first keyword in the document removed from consideration. The highest ranked remaining first keyword then is selected as another of the best keywords. The process of removing documents from consideration, reducing the number of occurrence counts for each first keyword and selecting another first keyword as a next best keyword continues until all available slots for the prescribed number of best keywords are filled, or until there are no more documents to consider. In some embodiments this same process is used to dynamically find the worst keywords from the set of second keywords. First, the highest ranked second keyword is selected. Each page that such keyword occurs in then is removed from consideration. In addition the number of occurrences for each second keyword is reduced by the number of occurrences of each such second keyword in the document removed from consideration. The highest ranked remaining second keyword then is selected as another of the worst keywords. The process of removing documents from consideration, reducing the number of occurrence counts for each second keyword and selecting another second keyword as a next worst keyword continues until all available slots for the prescribed number of worst keywords are filled, or until there are no more documents to consider.

Key Phrases

An additional or alternative method for finding keywords is to combine words into key phrases and use a multi-word key phrase in place of a one word keyword. One use of key phrases is to narrow the scope of the search to pinpoint the search to documents that are most likely to be of interest. A key phrase is obtained by looking at each occurrence of a first keyword and combining such keyword with the word preceding it in each occurrence. In addition, key phrases are also obtained by looking at each occurrence of the first keyword and combining such first keyword with the word following it in each occurrence. One or more of the two-word key phrases then are used in place of the one-word keyword.

In some embodiments the number of words in a key phrase is not more than a prescribed number of words. To achieve the multi-word key phrase the process for finding two-word key phrase is performed. Next for each two word phrase occurring more than once, three word phrases are formed in the same manner as the two word phrases. The three word key phrases is used in place of the two word key phrase. The process of building a key phrase continues in some embodiments up to a key phrase having at most a prescribed number of words (e.g., 5), or until no more key phrases occurring more than once are found. As the key phrase grows in length, the shorter key phrase from which it grew is dropped as a keyword. In some embodiments, the key phrases are ranked by number of documents that the key phrase occurs in and by word length. The longest length key phrases and/or the most occurring key phrases are used in the new search query. As a result, the best keywords are narrowed. In turn the scope of the search is narrowed to return those documents that are most likely to be of interest to the user. Key phrases are obtained for one or more keywords in the set of first keywords using this method for embodiments where at least one document is categorized as of interest and no documents are categorized as not of interest, or embodiments where at least one document is categorized as of interest and at least one document is categorized as not of interest.

Note that the method for determining key phrases does not depend upon both categorizations (i.e., some documents as of interest and some documents as not of interest). According to a preferred embodiment at least one document is categorized as of interest. Keywords are obtained and ranked for such documents by the method described above for obtaining and ranking first keywords in documents of interest. In a variation of an embodiment where only documents of interest are categorized, an additional step of filtering out keywords is performed to filter out common non-descript words (e.g., the, a, pronouns, prepositions). Such non-descript words are stored in a dictionary database. Key phrases are effective, however, even without such filtering and dictionary for embodiments in which at least one document is categorized as of interest and no documents are categorized as not of interest.

Method for Cleaning Dirty Keywords

Dirty keywords as described above are those words occurring in both documents categorized as 'of interest' and documents categorized as 'not of interest.' Key phrases are formed by examining the dirty keyword occurrences in the documents of interest. Using only documents of interest as the domain for forming the key phrases for this cleaning process lessens the likelihood that the key phrases substituted for the dirty keyword also occur in the documents not of interest. Such process is referred to herein as cleaning the dirty keywords. At one step key phrases are obtained for a highest ranking dirty keyword by looking at each occurrence of such dirty keyword in the documents of interest and combining such dirty keyword with the word preceding it in each occurrence. In addition, key phrases are also obtained by combining such dirty keyword with the word preceding it in each occurrence within the documents of interest. The two-word key phrases then are used in place of the one-word dirty keyword.

In some embodiments the resulting key phrases are tested to see if they also occur in the documents not of interest. If any occur in a document not of interest then they are still 'dirty.' Each dirty key phrase is cleaned by expanding the key phrase by a word. Thus the method is performed iteratively in some embodiments to obtain three word or longer phrases to clean dirty keywords/key phrases. Like for forming the two word key phrase, the word preceding the key phrase in a document of interest is combined with the key phrase. In addition the word following the key phrase in a document of interest is combined with the key phrase. This is done for each occurrence of the dirty key phrase in each document of interest. One or more cleaned key phrases then are used as a descriptor for the refined search phrase.

Meritorious and Advantageous Effects

One advantage of this invention is that more effective search queries are obtained based on subjective feedback from a user. A user views at least some of the results of an initial query and subjectively determines if a document is of interest or not of interest. Such information is used to automatically derive keywords for a subsequent search query phrase. The user can override any of the automatically generated query phrase clauses.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A method for refining an initial query phrase to search for documents of interest to a user, comprising the steps of:
   categorizing at least one document found in a search using the initial query phrase as of interest based upon feedback from the user;
   categorizing at least one other document found in the search using the initial query phrase as not of interest based upon feedback from the user;
   generating a list of keywords by analyzing only the categorized documents;
   ranking as first keywords, the keywords in the list of keywords which occur in only the documents of interest;
   ranking as second keywords, the keywords in the list of keywords which occur in only the documents not of interest;
   forming a refined query phrase to search for documents which include one or more of a plurality of the highest ranked first keywords, and to filter out documents which include any one or more of a plurality of the highest ranked second keywords.

2. The method of claim 1, wherein the step of ranking as first keywords comprises ranking by number of documents of interest that each respective first keyword occurs in; and wherein the step of ranking as second keywords comprises ranking by number of documents not of interest that each respective second keyword occurs in.

3. The method of claim 2, wherein ranking among a plurality of first keywords having a common number of documents of interest that each one of said plurality of first keywords occurs in is by number of occurrences.

4. The method of claim 1, wherein the step of ranking as first keywords comprises ranking by number of occurrences of each respective first keyword, and wherein the step of ranking as second keywords comprises ranking by number of occurrences of each respective second keyword.

5. The method of claim 1, wherein of all the documents found in the search, the documents not categorized as 'of interest' or 'not of interest' are uncategorized.

6. The method of claim 1, wherein a user views a plurality of documents, and of all the documents viewed by the user, the documents not categorized as 'of interest' by the user are categorized as 'not of interest.'

7. The method of claim 1, further comprising the step of:
ranking as third keywords, the keywords in the list of keywords which occur in both the documents of interest and the documents not of interest based upon a ratio of the number of documents of interest that the third keyword occurs in to the number of documents not of interest that the third keyword occurs in;
wherein the step of forming further comprises forming a refined query phrase to search for documents which include one or more of a plurality of the highest ranked third keywords.

8. The method of claim 1, further comprising the step of:
ranking as third keywords, the keywords in the list of keywords which occur in both the documents of interest and the documents not of interest based upon a ratio of the number of occurrences in the documents of interest to the number of occurrences in the documents not of interest; and
wherein the step of forming further comprises forming a refined query phrase to search for documents which include one or more of a plurality of the highest ranked third keywords.

9. The method of claim 1, further comprising the step of:
ranking as third keywords, the keywords in the list of keywords which occur in both the documents of interest and the documents not of interest based upon a ratio of the number of occurrences in the documents of interest to the total number of occurrences in both the documents of interest and documents not of interest; and
wherein the step of forming further comprises forming a refined query phrase to search for documents which include one or more of a plurality of the highest ranked third keywords.

10. The method of claim 1, further comprising the steps of:
identifying as third keywords, the keywords in the list of keywords which occur in both the documents of interest and the documents not of interest;
for at least one of the third keywords, replacing said at least one of the third keywords with a plurality of key phrases, wherein each one of the plurality of key phrases includes said at least one of the third keywords; and
wherein the step of forming further comprises forming a refined query phrase to search for documents which include one or more of the plurality of key phrases.

11. The method of claim 10, wherein each one of the plurality of key phrases is obtained by finding an occurrence of said one of the third keywords in a document of interest and combining said one of the third keywords with either one of a preceding word or following word in the respective occurrence.

12. The method of claim 1, further comprising for at least one of the first keywords, replacing said at least one of the first keywords with a plurality of key phrases, wherein each one of the plurality of key phrases includes said at least one of the first keywords, and wherein each one of the plurality of key phrases is obtained by finding an occurrence of said one of the first keywords and combining said one of the first keywords with either one of a preceding word or following word in the respective occurrence; and wherein the step of forming further comprises forming a refined query phrase to search for documents which include one or more of the plurality of key phrases.

13. A method for refining an initial query phrase to search for web pages on the world wide web that are of interest to a user, comprising the steps of:

categorizing at least one web page found in a search using the initial query phrase as of interest based upon feedback from the user;
categorizing at least one other web page found in the search using the initial query phrase as not of interest based upon feedback from the user;
generating a list of keywords by analyzing only the categorized web pages;
ranking as first keywords, the keywords in the list of keywords which occur in only the web pages of interest;
ranking as second keywords, the keywords in the list of keywords which occur in only the web pages not of interest;
forming a refined query phrase to search for web pages which include one or more of a plurality of the highest ranked first keywords, and to filter out web pages which include any one or more of a plurality of the highest ranked second keywords.

14. The method of claim 13, wherein the step of ranking as first keywords comprises ranking by number of web pages of interest that each respective first keyword occurs in; and wherein the step of ranking as second keywords comprises ranking by number of web pages not of interest that each respective second keyword occurs in.

15. The method of claim 14, wherein ranking among a plurality of first keywords having a common number of web pages of interest that each one of said plurality of first keywords occurs in is by number of occurrences.

16. The method of claim 13, wherein the step of ranking as first keywords comprises ranking by number of occurrences of each respective first keyword, and wherein the step of ranking as second keywords comprises ranking by number of occurrences of each respective second keyword.

17. The method of claim 13, wherein of all the web pages found in the search, the web pages not categorized as 'of interest' or 'not of interest' are uncategorized.

18. The method of claim 13, wherein a user views a plurality of web pages, and of all the web pages viewed by the user, the web pages not categorized as 'of interest' by the user are categorized as 'not of interest.'

19. The method of claim 13, further comprising the step of:
ranking as third keywords, the keywords in the list of keywords which occur in both the web pages of interest and the web pages not of interest based upon a ratio of the number of web pages of interest that the third keyword occurs in to the number of web pages not of interest that the third keyword occurs in;
wherein the step of forming further comprises forming a refined query phrase to search for web pages which include one or more of a plurality of the highest ranked third keywords.

20. The method of claim 13, further comprising the step of:
ranking as third keywords, the keywords in the list of keywords which occur in both the web pages of interest and the web pages not of interest based upon a ratio of the number of occurrences in the web pages of interest to the number of occurrences in the web pages not of interest; and
wherein the step of forming further comprises forming a refined query phrase to search for web pages which include one or more of a plurality of the highest ranked third keywords.

21. The method of claim 13, further comprising the step of:

ranking as third keywords, the keywords in the list of keywords which occur in both the web pages of interest and the web pages not of interest based upon a ratio of the number of occurrences in the web pages of interest to the total number of occurrences in both the we pages of interest and web pages not of interest; and wherein the step of forming further comprises forming a refined query phrase to search for web pages which include one or more of a plurality of the highest ranked third keywords.

22. The method of claim 13, further comprising the steps of:

identifying as third keywords, the keywords in the list of keywords which occur in both the web pages of interest and the web pages not of interest;

for at least one of the third keywords, replacing said at least one of the third keywords with a plurality of key phrases, wherein each one of the plurality of key phrases includes said at least one of the third keywords; and wherein the step of forming further comprises forming a refined query phrase to search for web pages which include one or more of the plurality of key phrases.

23. The method of claim 22, wherein each one of the plurality of key phrases is obtained by finding an occurrence of said one of the third keywords in a web page of interest and combining said one of the third keywords with either one of a preceding word or following word in the respective occurrence.

24. The method of claim 13, further comprising for at least one of the first keywords, replacing said at least one of the first keywords with a plurality of key phrases, wherein each one of the plurality of key phrases includes said at least one of the first keywords, and wherein each one of the plurality of key phrases is obtained by finding an occurrence of said one of the first keywords and combining said one of the first keywords with either one of a preceding word or following word in the respective occurrence; and wherein the step of forming further comprises forming a refined query phrase to search for web pages which include one or more of the plurality of key phrases.

25. A system for refining an initial query phrase to search for documents of interest to a user, comprising:

a display device;

an input device;

means for accessing a document domain;

processing means for categorizing at least one document found in a search using the initial query phrase as of interest based upon feedback from the user;

processing means for categorizing at least one other document found in the search using the initial query phrase as not of interest based upon feedback from the user;

processing means for ranking as first keywords, words which occur in only the documents of interest;

processing means for ranking as second keywords, words which occur in only the documents not of interest;

processing means for forming a refined query phrase to search for documents which include one or more of a plurality of the highest ranked first keywords, and to filter out documents which include any one or more of a plurality of the highest ranked second keywords.

26. The system of claim 25, wherein of all the documents found in the search, the documents not categorized as 'of interest' or 'not of interest' are uncategorized.

27. The system of claim 25, wherein a user views a plurality of documents, and of all the documents viewed by the user, the documents not categorized as 'of interest' by the user are categorized as 'not of interest.'

28. The system of claim 25, wherein the processing means for ranking as first keywords comprises means for ranking by number of documents of interest that each respective first keyword occurs in; and wherein the processing means for ranking as second keywords comprises means for ranking by number of documents not of interest that each respective second keyword occurs in.

29. The system of claim 28, wherein ranking among a plurality of first keywords having a common number of documents of interest that each one of said plurality of first keywords occurs in is by number of occurrences.

30. The system of claim 25, wherein the processing means for ranking as first keywords comprises means for ranking by number of occurrences of each respective first keyword, and wherein the processing means for ranking as second keywords comprises means for ranking by number of occurrences of each respective second keyword.

31. The system of claim 25, further comprising:

processing means for ranking as third keywords, the keywords in the list of keywords which occur in both the documents of interest and the documents not of interest based upon a ratio of the number of documents of interest that the third keyword occurs in to the number of documents not of interest that the third keyword occurs in;

wherein the processing means for forming forms the refined query phrase to encompass documents which include one or more of a plurality of the highest ranked third keywords.

32. The system of claim 25, further comprising:

processing means for ranking as third keywords, the keywords in the list of keywords which occur in both the documents of interest and the documents not of interest based upon a ratio of the number of occurrences in the documents of interest to the total number of occurrences in both the documents of interest and documents not of interest; and wherein the processing means for forming forms the refined query phrase to encompass documents which include one or more of a plurality of the highest ranked third keywords.

33. The system of claim 25, further comprising:

processing means for identifying as third keywords, the keywords in the list of keywords which occur in both the documents of interest and the documents not of interest;

processing means for replacing at least one of the third keywords with a plurality of key phrases, wherein each one of the plurality of key phrases includes said at least one of the third keywords; and wherein the processing means for forming forms the refined query phrase to encompass documents which include one or more of the plurality of key phrases.

34. A method for refining an initial query phrase to search for documents of interest to a user, comprising the steps of:

categorizing at least one document found in a search using the initial query phrase as of interest based upon feedback from the user;

generating a list of words occurring in the at least one document categorized as of interest;

ranking the words in said list of words as keywords;

for at least one of the ranked keywords, replacing said one of the ranked keywords with a plurality of key phrases, wherein each one of the plurality of key phrases includes said one ranked keyword, and wherein each one of the plurality of key phrases is obtained by finding an occurrence of said one ranked keyword and combining said one ranked keyword with either one of a preceding word or following word in the respective occurrence of said keyword in a document of interest;

forming a refined query phrase to search for documents which include one or more of a plurality of the keywords and key phrases.

35. The method of claim 34, wherein the step of ranking comprises ranking the words in said list of words by number of documents of interest that each respective word occurs in.

36. The method of claim 35, wherein ranking among a plurality of words having a common number of documents of interest that each one of said plurality of words occurs in is by number of occurrences.

37. The method of claim 34, wherein the step of ranking comprises ranking the words in said list of words by number of occurrences in the documents categorized as of interest.

38. The method of claim 35, wherein the step of ranking comprises filtering out words in said list of words which occur in a list of words excluded from being keywords.

39. A system for refining an initial query phrase to search for documents of interest to a user, comprising:

a display device;

an input device;

means for accessing a document domain;

processing means for categorizing at least one document found in a search using the initial query phrase as of interest based upon feedback from the user;

processing means for ranking keywords which occur in the documents of interest;

for at least one of the ranked keywords, processing means for replacing said one of the ranked keywords with a plurality of key phrases, wherein each one of the plurality of key phrases includes said one ranked keyword, and wherein each one of the plurality of key phrases is obtained by finding an occurrence of said one ranked keyword and combining said one ranked keyword with either one of a preceding word or following word in the respective occurrence of said keyword in a document of interest; and processing means for forming a refined query phrase to search for documents which include one or more of a plurality of the keywords and key phrases.

40. The system of claim 39, wherein the processing means for ranking comprises means for ranking the words in said list of words by number of documents of interest that each respective word occurs in.

41. The system of claim 40, wherein the processing means for ranking comprises means for ranking among a plurality of words having a common number of documents of interest that each one of said plurality of words occurs in is by number of occurrences.

42. The system of claim 39, wherein the processing means for ranking comprises means for ranking the words in said list of words by number of occurrences in the documents categorized as of interest.

43. The system of claim 42, wherein the processing means for ranking comprises means for filtering out words in said list of words which occur in a list of words excluded from being keywords.

* * * * *